(12) United States Patent
Holmquist

(10) Patent No.: US 7,775,107 B2
(45) Date of Patent: Aug. 17, 2010

(54) MEASURING ROTOR IMBALANCE VIA BLADE CLEARANCE SENSORS

(75) Inventor: Eric B. Holmquist, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 308 days.

(21) Appl. No.: 11/866,652

(22) Filed: Oct. 3, 2007

(65) Prior Publication Data

US 2009/0090182 A1    Apr. 9, 2009

(51) Int. Cl.
*G01M 1/00* (2006.01)
(52) U.S. Cl. ......................... 73/455; 700/279
(58) Field of Classification Search ................... 73/455, 73/66; 415/118; 700/279, 280; 706/23
See application file for complete search history.

(56) References Cited

U.S. PATENT DOCUMENTS

| | | | |
|---|---|---|---|
| 4,818,948 A | 4/1989 | Dooley | |
| 4,856,272 A | 8/1989 | Putman et al. | |
| 5,154,975 A | 10/1992 | Sekiguchi et al. | |
| 5,313,407 A * | 5/1994 | Tiernan et al. | 700/280 |
| 5,367,612 A * | 11/1994 | Bozich et al. | 706/23 |
| 5,426,720 A * | 6/1995 | Bozich et al. | 706/23 |
| 5,475,622 A * | 12/1995 | Reinfelder et al. | 700/279 |
| 5,545,007 A | 8/1996 | Martin | |
| 5,576,972 A * | 11/1996 | Harrison | 702/128 |
| 5,586,065 A * | 12/1996 | Travis | 702/191 |
| 5,675,497 A * | 10/1997 | Petsche et al. | 702/182 |
| 5,688,107 A | 11/1997 | Downs et al. | |
| 5,854,993 A * | 12/1998 | Grichnik | 702/54 |
| 6,137,886 A * | 10/2000 | Shoureshi | 381/71.2 |
| 6,185,171 B1 * | 2/2001 | Bassett et al. | 369/53.18 |
| 6,358,009 B1 * | 3/2002 | Link | 416/145 |
| 6,575,011 B1 | 6/2003 | Busby et al. | |
| 6,594,619 B1 * | 7/2003 | von Flotow | 702/184 |
| 6,601,054 B1 * | 7/2003 | Lo et al. | 706/30 |
| 6,717,418 B2 | 4/2004 | Orenstein | |
| 6,779,400 B1 * | 8/2004 | Thelen et al. | 73/471 |
| 6,785,635 B2 * | 8/2004 | von Flotow | 702/184 |
| 6,863,495 B2 | 3/2005 | Halliwell et al. | |
| 6,949,922 B2 | 9/2005 | Twerdochlib et al. | |
| 6,976,012 B1 * | 12/2005 | Rising, III | 706/25 |
| 7,085,655 B2 * | 8/2006 | Ferrer | 702/35 |
| 7,096,673 B2 | 8/2006 | Little et al. | |
| 7,400,943 B2 * | 7/2008 | Vian et al. | 700/279 |
| 2003/0060986 A1 * | 3/2003 | Flotow | 702/36 |
| 2004/0249520 A1 * | 12/2004 | Maine | 701/3 |

OTHER PUBLICATIONS

Tappert, P., "Autonomous PHM with Blade-Tip Sensors: Algorithms and Seeded Fault Experience", 2001 IEEE Aeroconference, Hood Technology Corporation.
Flotow, Andy Von, Disk Burst Prognostics Using Blade Tip Sensors, TMS Annual Meeting, San Diego, CA Mar. 2003, Hood Technology Corporation.

* cited by examiner

*Primary Examiner*—Hezron Williams
*Assistant Examiner*—Samir M Shah
(74) *Attorney, Agent, or Firm*—Carlson, Gaskey & Olds

(57) ABSTRACT

A system and method can be utilized to determine an out of balance condition of a rotor having a plurality of blades. The system monitors a clearance between the blades and an associated housing. By looking at a center of that clearance information, a determination can be made of the magnitude of imbalance of the rotor.

12 Claims, 2 Drawing Sheets

MEASURING ROTOR IMBALANCE VIA BLADE CLEARANCE SENSORS

BACKGROUND OF THE INVENTION

This application relates to a system which utilizes blade clearance information to identify the magnitude and location of a rotor imbalance.

Gas turbine engines include a plurality of sections mounted in series. Typically, a fan may deliver air into a compressor section. The air is compressed and delivered downstream into a combustion chamber where it is mixed with fuel and combusted. Products of that combustion pass downstream over turbine rotors.

The fan, the compressor, and the turbines all include rotors with attached blades.

It is known to monitor the tip clearance of at least some of the blades of these rotors. Such monitoring may be utilized to determine potential problems with the rotors or the blades. It is known to utilize microwave signals, and monitor a reflected signal to identify a tip clearance.

One other feature that is often monitored with regard to such rotors is rotor imbalance. If the rotors are out of balance, severe vibration can occur, which is undesirable. To date, engine rotor balance technology has required special test instrumentation or ground support equipment. Installing this instrumentation is time consuming, and requires the engine to be out of service for a period of time. The ground support equipment is limited, and there is often a wait to obtain this equipment.

SUMMARY OF THE INVENTION

In the disclosed embodiment of this invention, the results from a blade clearance sensor are utilized to identify the magnitude of imbalance of a rotor. The same information can be utilized to determine the location of the imbalance.

These and other features of the present invention can be best understood from the following specification and drawings, the following of which is a brief description.

DETAILED DESCRIPTION OF THE PREFERRED EMBODIMENT

Figure 1:
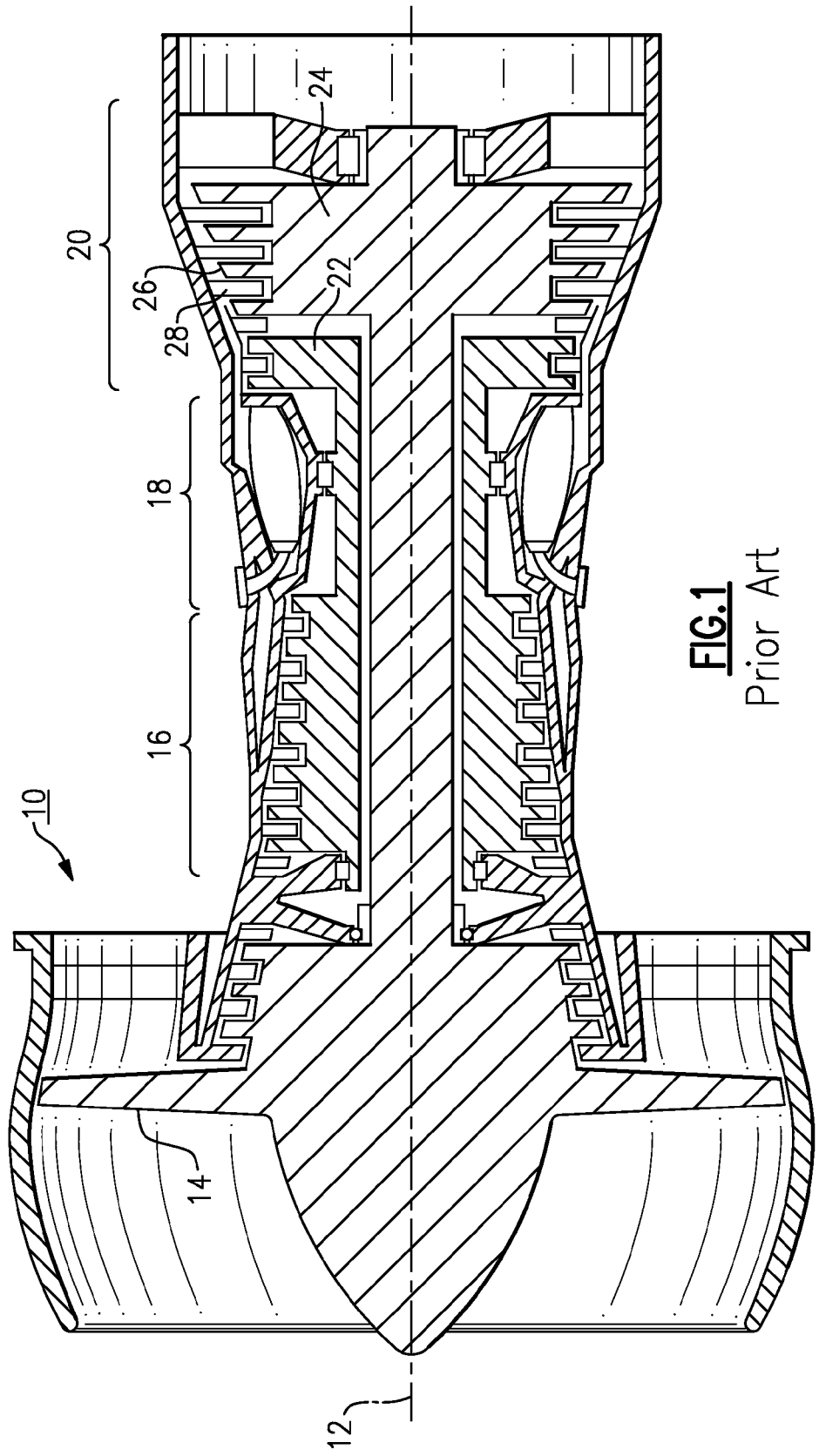
FIG. 1 is a schematic view of a gas turbine engine.

FIG. 1 illustrates selected portions of an example gas turbine engine 10, such as a turbofan gas turbine engine used for propulsion. In this example, the turbine engine 10 is circumferentially disposed about an engine centerline 12. The turbine engine 10 includes a fan 14, a compressor section 16, a combustion section 18, and a turbine section 20. The combustion section 18 and the turbine section 20 include corresponding blades 22 and vanes 24. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown.

Figure 2:
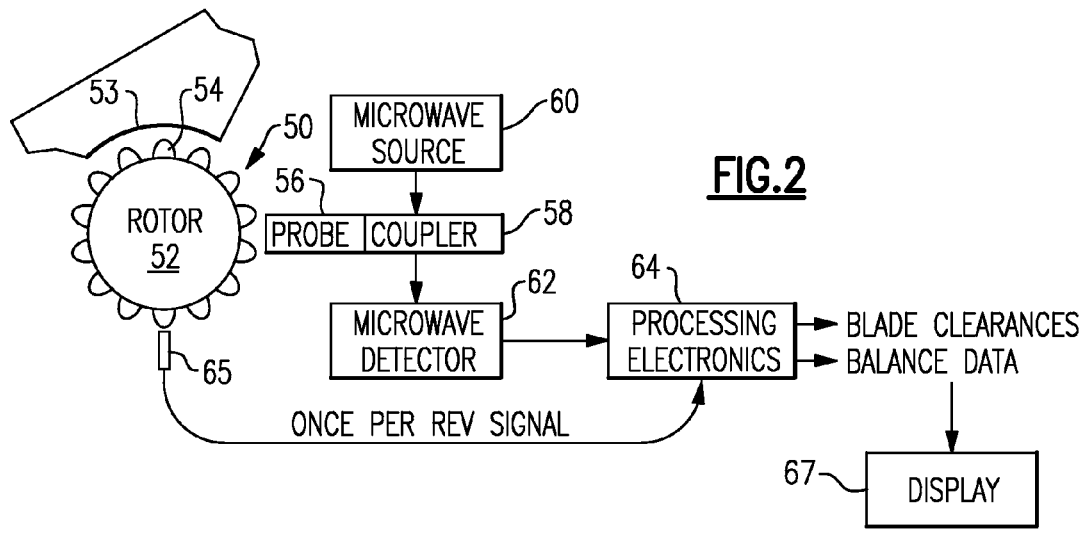
FIG. 2 is a system for identifying an imbalance with regard to a rotor in the FIG. 1 system.

FIG. 2 shows a system 50 for identifying an imbalance for a rotor 52 having a plurality of blades 54 spaced from a housing 53. While this invention may relate to any number of rotors having blades, in particular, it is well suited for the rotors such as are found in a gas turbine engine. A probe 56 may be utilized to determine a clearance between the outer tip of the blades 54 and the inner surface 53 of the housing. Such sensors are in use today, and are known in the art.

The probe 56 may communicate with a coupler 58, and receive microwave signals from a source 60. A detector 62 may detect a reflected signal, and submit that detected signal to processing electronics 64. The processing electronic 64 may also be provided with a signal 65 indicative of the completion of a rotation cycle. Such systems are known, and have been utilized in the past for determining blade clearance.

Figure 3:
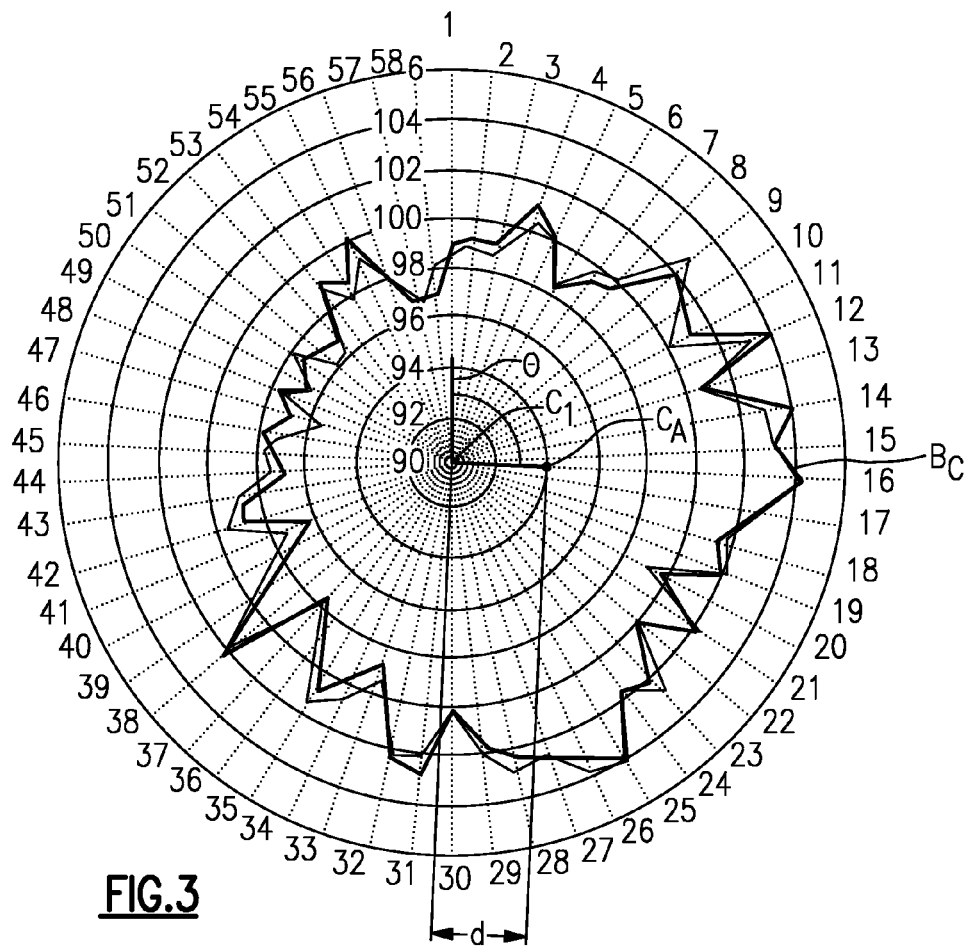
FIG. 3 is a sample result for performing the method of this invention.

The present invention is directed to utilizing the blade clearance information to determine an imbalance of the rotor 52. As shown in FIG. 3, a series of clearances for multiple rotation of a rotor having 58 blades might well look like as shown at $B_C$. As can be appreciated, this clearance information is offset relative to a center $C_1$ of the rotor. The offset of the $B_C$ information relative to the center $C_1$, is indicative of the rotor being out of balance.

Known processing techniques can be utilized on the $B_C$ information. As an example, fast Fourier transforms can be utilized, or any other way of calculating a center of the information $B_C$ can be utilized. The center of that information is shown at $C_A$. This is the apparent center, due to the imbalance. In essence, this is the actual center which can be compared to an expected center $C_1$. The distance d between $C_1$ and $C_A$ is the magnitude of the displacement of the center of mass, and is indicative of the magnitude of the imbalance. An angle θ can be defined between any point, and a location of $C_A$. As shown in FIG. 3, the location of the number one blade to the location of the apparent center $C_A$ is utilized to determine θ. By determining θ, the location of the center of the imbalance can be determined. A worker of ordinary skill in this art with knowledge of the apparent center and θ, would know how to provide a counterweight to correct the imbalance.

Since the present invention utilizes sensor technology that is already incorporated into gas turbine engines for other purposes, no new instrumentation is necessary to achieve the invention. Moreover, since this existing sensor is utilized, the present invention can provide imbalance information in real time, and without taking the engine out of service. As an example, if on one flight an incident occurred that could have affected the balance of the rotor, the electronics would have been able to identify the change in the imbalance, and could provide a warning to a pilot. An example display 67 may be utilized to provide such a warning to the pilot that the rotor imbalance has exceeded a magnitude that had been preset as a limit.

Alternatively, the system can also be utilized to provide routine maintenance information, and the location to which a counterweight can be attached to correct the imbalance.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A system for identifying an out of balance rotor comprising:

a sensor for sensing a clearance between a plurality of blades and a housing surface, clearance information from said sensor being delivered to a control;

said control being operable to receive said clearance information, and determine a center of the clearance information, and compare the distance between an actual center of the clearance information, and an expected center of the clearance information should there be no imbalance, said distance being taken as a magnitude of imbalance of the rotor; and said rotor imbalance is determined in real time, while the system is mounted in an aircraft.

2. The system as set forth in claim 1, wherein said sensor sends a microwave signal, and receives and analyzes a reflected microwave signal.

3. The system as set forth in claim 1, wherein a plurality of revolutions of the rotor are taken as said clearance information.

4. The system as set forth in claim 1, wherein the location of the actual center of the clearance information is used to determine the location of the imbalance.

5. A method for identifying an out of balance rotor comprising:

gathering clearance information of the clearance between a plurality of blades and a housing surface;

determining a center of the clearance information, and comparing a distance between an actual center of the clearance information, and an expected center of the clearance information should there be no imbalance, said distance being taken as a magnitude of imbalance of the rotor; and said rotor imbalance is determined in real time, while the system is mounted in an aircraft.

6. The method as set forth in claim 5, wherein said sensor sends a microwave signal, and receives and analyzes a reflected microwave signal.

7. The method as set forth in claim 5, wherein a plurality of revolutions of the rotor are taken as said clearance information.

8. The method as set forth in claim 5, wherein the location of the actual center of the clearance information is used to determine the location of the imbalance.

9. A gas turbine engine comprising:

at least one rotor having a plurality of blades, the blades rotating spaced from a housing surface;

a sensor for sensing a clearance between the plurality of blades and the housing surface, clearance information from said sensor being delivered to a control;

said control being operable to receive said clearance information, and determine a center of the clearance information, and compare the distance between an actual center of the clearance information, and an expected center of the clearance information should there be no imbalance, said distance being taken as a magnitude of imbalance of the rotor; and said rotor imbalance determination is determined in real time, while the system is mounted in an aircraft.

10. The engine as set forth in claim 9, wherein said sensor sends a microwave signal, and receives and analyzes a reflected microwave signal.

11. The engine as set forth in claim 9, wherein a plurality of revolutions of the rotor are taken as said clearance information.

12. The engine as set forth in claim 9, wherein the location of the actual center of the clearance information is used to determine the location of the imbalance.

* * * * *